US010922242B2

(12) United States Patent
Lappi et al.

(10) Patent No.: US 10,922,242 B2
(45) Date of Patent: Feb. 16, 2021

(54) ADAPTABLE LOGICAL TO PHYSICAL TABLES FOR MULTIPLE SECTOR PATTERN SUPPORT

(71) Applicant: Western Digital Technologies, Inc., San Jose, CA (US)

(72) Inventors: Cory Lappi, Rochester, MN (US); William Jared Walker, Rochester, MN (US); Darin Edward Gerhart, Oronoco, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/450,838

(22) Filed: Jun. 24, 2019

(65) Prior Publication Data
US 2020/0110709 A1    Apr. 9, 2020

Related U.S. Application Data

(60) Provisional application No. 62/743,512, filed on Oct. 9, 2018.

(51) Int. Cl.
*G06F 12/1009* (2016.01)

(52) U.S. Cl.
CPC .... *G06F 12/1009* (2013.01); *G06F 2212/657* (2013.01)

(58) Field of Classification Search
CPC .................................................. G06F 12/1009
See application file for complete search history.

(56) References Cited

U.S. PATENT DOCUMENTS

| | | | |
|---|---|---|---|
| 10,474,359 B1* | 11/2019 | Volpe | G06F 12/1027 |
| 2008/0228990 A1* | 9/2008 | Tomonaga | G06F 3/0683 711/100 |
| 2012/0254514 A1* | 10/2012 | Nishikubo | G06F 12/0246 711/103 |
| 2017/0090815 A1* | 3/2017 | Kelner | G06F 3/0611 |
| 2017/0103025 A1* | 4/2017 | Meyer | H04L 9/0618 |
| 2018/0359227 A1* | 12/2018 | Trantham | H04L 63/0457 |
| 2019/0121571 A1* | 4/2019 | Wahla | G06F 3/0622 |
| 2019/0332540 A1* | 10/2019 | Kang | G06F 12/0873 |
| 2020/0073799 A1* | 3/2020 | Lee | G06F 1/329 |

\* cited by examiner

*Primary Examiner* — Edward J Dudek, Jr.
(74) *Attorney, Agent, or Firm* — Patterson & Sheridan, LLP; Steven H. Versteeg

(57) ABSTRACT

The present disclosure describes logical to physical tables that are configured to provide multiple sector support and provide for help in processing of data when a sector is mapped or unmapped. In the cases where sectors are unmapped, the present disclosure provides mechanisms to concurrently support multiple unique unmapped data patterns depending upon the specific type of unmapped sector.

19 Claims, 9 Drawing Sheets

PATTERN CONFIGURATION MODE PAGE FORMAT

| BYTE | BIT | | | | | | | |
|---|---|---|---|---|---|---|---|---|
| | 7 | 6 | 5 | 4 | 3 | 2 | 1 | 0 |
| 0 | PS | SPF = 1 | PAGE CODE = TBD (VENDOR UNIQUE SPACE) | | | | | |
| 1 | SUBPAGE CODE = TBD (VENDOR UNIQUE SPACE) | | | | | | | |
| 2-3 | PAGE LENGTH = n-3 | | | | | | | |
| 4-n | PATTERN CONFIGURATION DESCRIPTIONS | | | | | | | |

FIG. 1

PATTERN CONFIGURATION DESCRIPTOR FORMAT

| BYTE | BIT | | | | | | | |
|---|---|---|---|---|---|---|---|---|
| | 7 | 6 | 5 | 4 | 3 | 2 | 1 | 0 |
| 0-1 | PATTERN BUFFER ID | | | | | | | |
| 2-3 | DESCRIPTOR LENGTH | | | | | | | |
| 4-4227 | PATTERN ARRAY | | | | | | | |

FIG. 2

MAPPED IU FORMAT

| BYTE | BIT | | | | | | | |
|---|---|---|---|---|---|---|---|---|
| | 7 | 6 | 5 | 4 | 3 | 2 | 1 | 0 |
| 0 | M=1 | DIE | | | | | | |
| 1 | ERASE BLOCK | | | | | | | |
| 2 | ERASE BLOCK | | | PAGE | | | | |
| 3 | PAGE | | | | | | OFFSET | |

FIG. 3

UNMAPPED IU FORMAT

| BYTE | BIT | | | | | | | |
|---|---|---|---|---|---|---|---|---|
| | 7 | 6 | 5 | 4 | 3 | 2 | 1 | 0 |
| 0 | M=0 | SECTOR PATTERN BUFFER LOCATION | | | | | | |
| 1 | ADDITIONAL PATTERN BUFFER DATA | | | | | | | |
| 2 | | | | | | | | |
| 3 | | | | | | | | |

FIG. 4

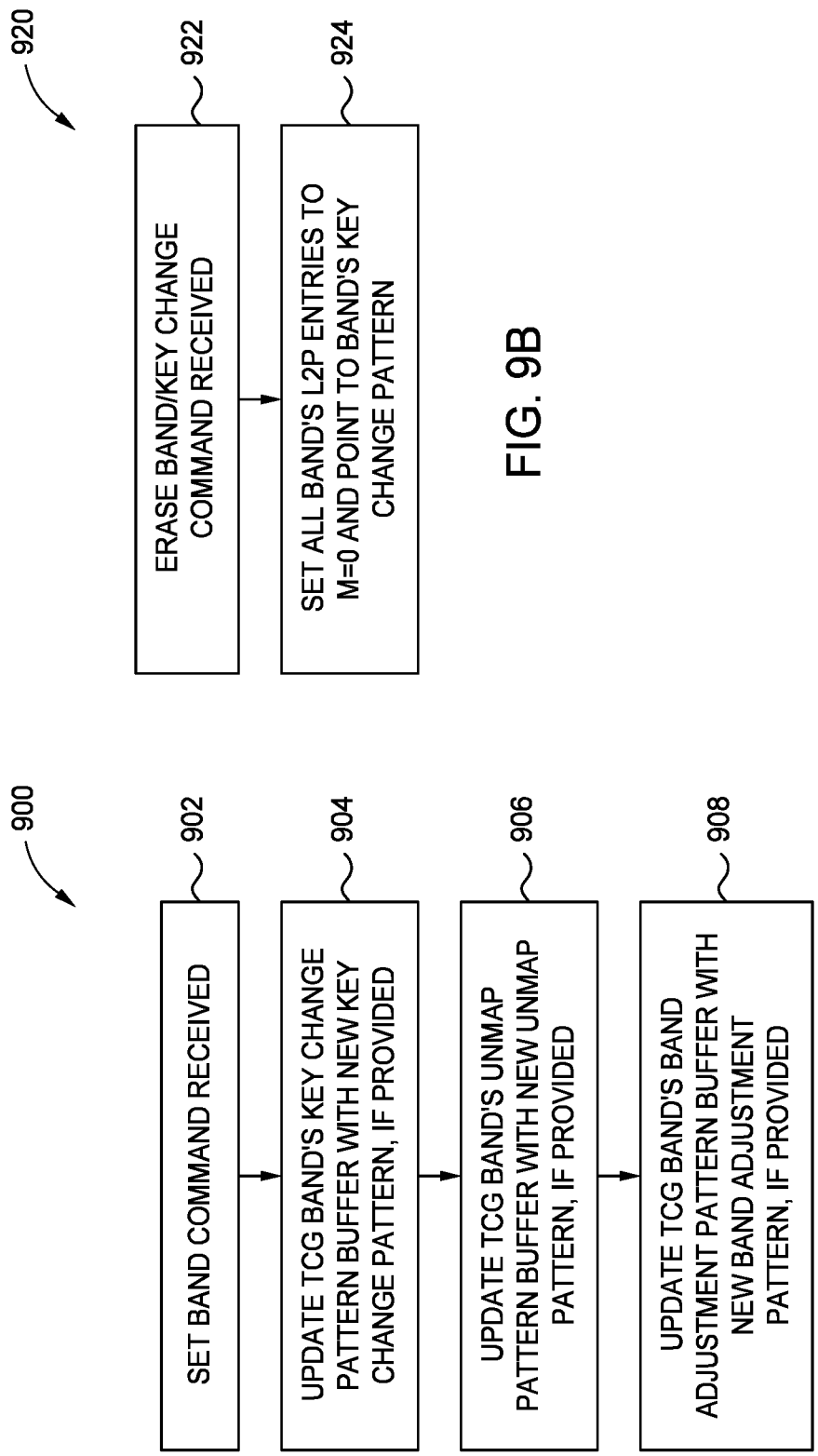

ADAPTABLE LOGICAL TO PHYSICAL TABLES FOR MULTIPLE SECTOR PATTERN SUPPORT

CROSS-REFERENCE TO RELATED APPLICATIONS

This application claims benefit of U.S. Provisional Patent Application Ser. No. 62/743,512, filed Oct. 9, 2018, which is herein incorporated by reference.

BACKGROUND OF THE DISCLOSURE

Field of the Disclosure

Embodiments of the present disclosure generally relate to solid state drives ("SSDs"). More specifically, aspects of the disclosure relate to logical to physical ("L2P") tables, use of L2P tables, and data used in conjunction with L2P tables.

Description of the Related Art

Logical to physical tables are used with a SSD to provide a map of sector addresses to physical NAND addresses. L2P tables may also provide information related to the mapping state of the SSD, thereby indicating if a specific sector is not presently written on the NAND.

The sectors are conventionally grouped into indirection units (IUs). This grouping reduces the DRAM requirement for storing large arrays of data. A trend among users of SSDs is to request different data patterns for unmapped sectors depending on how the sectors were unmapped.

Unmapping of sectors occurs during various computer procedures. Unmapping of sectors may be related to format commands, unmap commands, key change operations, and sanitize/ISE ("Instant Secure Erase") commands. Current L2P implementations generally try to avoid consuming memory. For this reason, L2P implementations avoid increasing the size of the L2P as such growth of the L2P may be considerable.

There is a need to provide for better use of L2P storage in order to allow for multiple sector pattern function.

There is a further need to provide for better L2P storage while minimizing the need for new hardware associated with processing.

There is a further need to minimize the use of memory, such as DRAM, during processing.

There is a still further need to provide for flexibility of a drive manufacturer to meet different customer requirements while minimizing costs associated with new hardware and methods for processing.

SUMMARY OF THE DISCLOSURE

In one embodiment, a method is disclosed comprising providing a logical to physical table for a computing arrangement, wherein the table provides a map of logical sector addresses to physical NAND address and a mapped state of the NAND, wherein sectors of the NAND are grouped into indirection units, receiving a read command specifying read data at a controller for the NAND, the read command originating from a host, determining, through the logical to physical table, if the read command received at the controller for the NAND corresponds to an unmapped portion of the NAND; performing a read of the NAND when the logical to physical table indicates a mapped sector, determining a desired sector pattern from the logical to physical entry when the logical to physical table is unmapped and returning a specified pattern for the read data to the host.

In another example embodiment, a method is disclosed comprising providing a logical to physical table for a computing arrangement, wherein the table provides a map of logical sector addresses to physical NAND address and a mapped state of the NAND, wherein sectors of the NAND are grouped into indirection units, receiving a command at a controller for the NAND, the command originating from a host, reviewing the command received at the controller for the NAND to determine if a pattern is specified for at least one sector and that the pattern specified is different than an existing pattern for the at least one sector; and changing the existing pattern to the pattern specified when the existing pattern is different than the specified pattern.

In another embodiment, a method is disclosed comprising: providing a logical to physical table for a computing arrangement, wherein the table provides a map of logical sector addresses to physical NAND address and a mapped state of the NAND, wherein sectors of the NAND are grouped into indirection units, receiving a command at a controller for the NAND, the read command originating from a host, reading data in the logical to physical table to determine a pattern for at least one sector of the NAND and encoding data into an indirection unit based upon a specific pattern received at the controller for the NAND.

In another example embodiment, an arrangement is disclosed comprising means for providing a logical to physical table for a computing arrangement, wherein the table provides a map of logical sector addresses to physical NAND address and a mapped state of NAND, wherein sectors of the NAND are grouped into indirection units; means for receiving a read command specifying read data at a controller for the NAND, the read command originating from a host; means for determining if the read command received at the controller for the NAND corresponds to an unmapped portion of the NAND; and means for performing a read of the NAND when the logical to physical table indicates a mapped sector.

In another example embodiment, an arrangement is disclosed comprising means for providing a logical to physical table for a computing arrangement, wherein the table provides a map of logical sector addresses to physical NAND address and a mapped state of the NAND, wherein sectors of the NAND are grouped into indirection units; means for receiving a command at a controller for the NAND, the command originating from a host; means for reviewing the command received at the controller for the NAND to determine if a pattern is specified for at least one sector and that the pattern specified is different than an existing pattern for the at least one sector; and means for changing the existing pattern to the pattern specified when the existing pattern is different than the specified pattern.

In one embodiment, a storage device, comprises: a memory device containing a logical to physical table for a computing arrangement, wherein the table provides a map of logical sector addresses to physical address and a mapped state of the memory device, wherein sectors of the memory device are grouped into indirection units; and a controller coupled to the memory device, the controller is configured to: receive a read command specifying read data at the controller for the memory device, the read command originating from a host; determine, through the logical to physical table, if the read command received at the controller corresponds to an unmapped portion of the memory device; perform a read of the memory device when the logical to physical table indicates a mapped sector; determine a desired sector pattern from the logical to physical entry when the logical to physical table is unmapped; and return a specified pattern for the read data to the host.

In another embodiment, a storage device, comprises: a memory device containing a logical to physical table for a computing arrangement, wherein the table provides a map of logical sector addresses to physical address and a mapped state of the memory device, wherein sectors of the memory device are grouped into indirection units; and a controller coupled to the memory device, the controller is configured to: receive a TCG band command; update TCG band's key change pattern buffer with new key change pattern; update TCG's band unmap pattern; and update TCG band's band adjustment pattern buffer with new band adjustment pattern.

In another embodiment, a storage device, comprises: a memory device; means for providing a logical to physical table for a computing arrangement, wherein the table provides a map of logical sector addresses to physical address and a mapped state of the memory device, wherein sectors of the memory device are grouped into indirection units; means for receiving a command at a controller for the memory device, the command originating from a host; means for reviewing the command received at the controller to determine if a pattern is specified for at least one sector and that the pattern specified is different than an existing pattern for the at least one sector; and means for changing the existing pattern to the pattern specified when the existing pattern is different than the specified pattern.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a pattern configuration mode page format in one example embodiment of the disclosure.

FIG. 2 is a pattern configuration descriptor format in another example embodiment of the disclosure.

FIG. 3 is a mapped indirection unit format in another example embodiment of the disclosure.

FIG. 4 is an unmapped indirection unit format in another example embodiment of the disclosure.

FIGS. 9A, 9B, 9C and 9D are TCG band flow diagrams in accordance with another example embodiment of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 5:
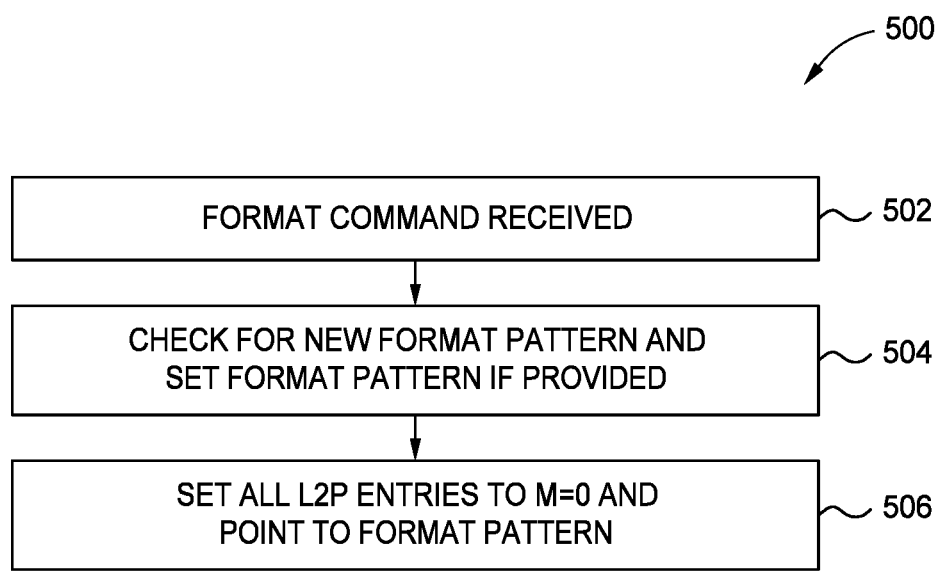
FIG. 5 is a format flow diagram in accordance with another example embodiment.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, the use of solid state drives and devices. In the embodiments described, a data storage arrangement (drive) is connected to the host system. The function of the data storage arrangement, such as a solid state drive, is to accept data and store the data until needed again by a user or the host. The data storage arrangement may be configured to accept bursts of data, depending on the process, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a SAS Interface or Serial ATA (SATA) compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The data storage arrangement may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

The present disclosure relates to logical to physical tables, their usage and the data contained therein. When an IU is mapped, normally the IU will have an L2P entry that will consist of a physical NAND address and a bit indicating if the IU is mapped or unmapped. In an instance when an IU is unmapped, there is implicitly no physical address.

In aspects disclosed, bits that were allocated for the physical address in an unmapped IU are re-used to describe a location for the pattern buffer to use for that IU's sectors.

The pattern buffer location, for example, may be described in a number of ways. A pattern type may be described wherein a certain location is described within the drive for the pattern. An SRAM or DRAM buffer address may also be described. A custom or reserved NVM address may be described. In another embodiment, a custom hardware buffer address may be used.

On a read command, the data from a pattern buffer is populated into the read cache/buffer for the host DMA. Sector patterns may be set from the host using an existing format IP sector commands, vendor unique sector pattern commands, new command types, like extending TCG set band commands to provide band sector support and vendor unique mode commands.

In an alternative method, the bits in the L2P may be used to store the data pattern itself, which would be repeated to fill out the sector buffer's size.

FIG. 1 is a diagram of input controls for a pattern configuration mode page format in one aspect described. In an "x" direction a range of bits 0 to 7 (right to left) is presented. In a vertical axis, byte ranges range from 0 to a value of greater than or equal to 4.

For byte 1, a subpage code is identified for vendor unique use is described. For bytes 2 and 3, a page length is identified as equal to the value n−3. For bytes 4 to n, pattern configuration descriptors are identified. FIG. 2 illustrates an example format for a pattern configuration descriptor. These inputs may be used to designate specific features that may be used, for example, by a controller for processing data associated with the mode page data. Thus, a controller may refer to the input values to provide for quick identification of data within the system. The data described in FIGS. 1, 2, 3 and 4, may be used for clarification and to speed processing of data.

FIG. 2 is a diagram of input controls for a pattern configuration descriptor format in one aspect described. In an "x" direction a range of bits 0 to 7 (right to left) is presented. In a vertical axis, byte ranges range from 0 to a value of greater than or equal to 4 to 4227. For bytes 0 and 1 a pattern buffer ID is identified. For bytes 2 and 3, a descriptor length is identified. For bytes 4 to 4227, a pattern array is identified.

FIG. 3 is a diagram of mapped IU format in one aspect described. In an "x" direction a range of bits 0 to 7 (right to left) is presented. In a vertical axis, byte ranges range from 0 to 3. A die descriptor is provided for byte 0, bits 0 to 6. In byte 0, bit 7 is the mapped (M) bit, where M=1 for a mapped IU. An erase block descriptor is provided in byte 1 bits 0 to 7 and byte 2 bits 6 to 7; for byte 2, bits 0 to 6, a page descriptor is provided. For all of byte 3, a page offset descriptor is provided.

FIG. 4 is a diagram of an unmapped IU format in one aspect described. In an "x" direction a range of bits 0 to 7 (right to left) is presented. In a vertical axis, byte ranges range from 0 to 3. A sector pattern buffer location descriptor is provided for byte 0, bits 0 to 6. In byte 0, bit 7 is the mapped (M) bit, where M=0 for an unmapped IU. For all of bytes 1, 2 and 3, additional pattern buffer data may be provided for later use.

Referring to FIG. 5, a method 500 for formatting following a receipt of a format command is shown. As provided, the method 500 may use data provided in FIGS. 1 to 4, to provide for quick and efficient processing. At 502, a format command is received at a controller for a SSD. The command may be generated, for example, by a host (computer) that is connected to a SSD, thus the controller for the SSD must process the request made by the host. At 504, the format command that was received is checked for a new format pattern. A format pattern may be set if the pattern is provided in the format command. The method continues at 506, wherein all L2P entries are set to M=0 and are directed to use the format pattern.

Figure 6A:
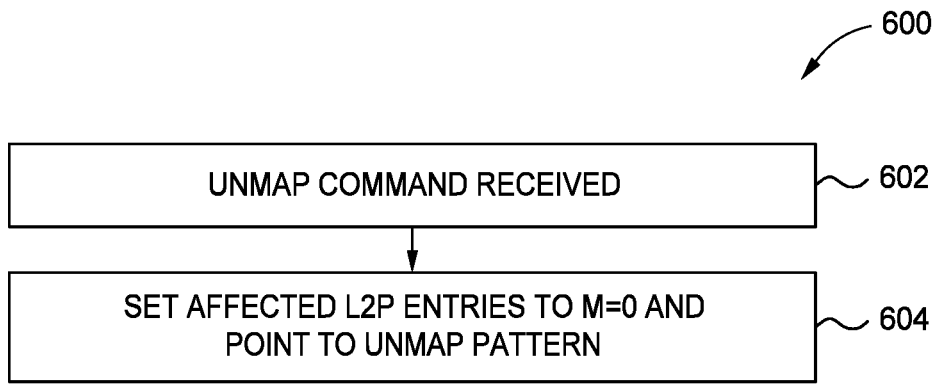
FIGS. 6A and 6B are unmap flow diagrams in accordance with another example embodiment.
Figure 6B:
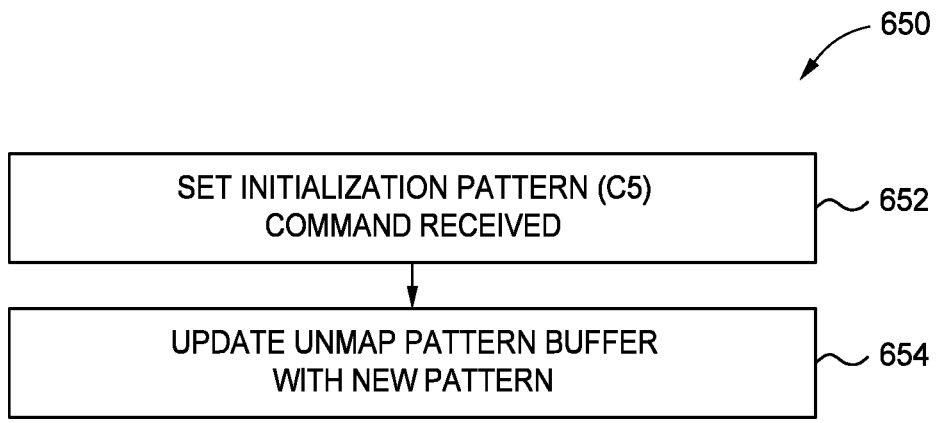

Referring to FIG. 6A, an unmap flow diagram method 600 is described. In this method, an unmap command is received at a controller for the SSD at 602. As with FIG. 5 above, the unmap command may be generated by a host connected to an SSD. The method then proceeds to 604 wherein the L2P entries that are the subject of the unmap command in 600, the value M is set to 0 and are pointed to an unmap pattern. Referring to FIG. 6B, set initialization pattern methods 650 are described. At 652, a set initialization pattern command is received at a controller for the SSD. The command may be generated, for example, by a host connected to the SSD. The command received at 652 may have a pattern associated with the command. The method then proceeds to 654 wherein the unmap pattern buffer is updated with a new pattern that is received in 652.

Figure 7:
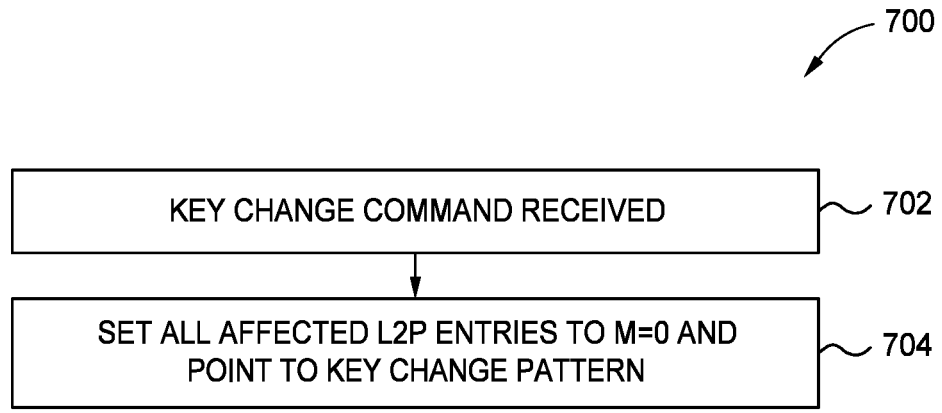
FIG. 7 is a key change flow diagram in accordance with another example embodiment.

Referring to FIG. 7, key change flow method 700 is illustrated. At 702, a key change command is received at a controller of a SSD. At 704, for the L2P entries that are affected, the value M is set to 0 and the entries are pointed to a key change pattern.

Figure 8:
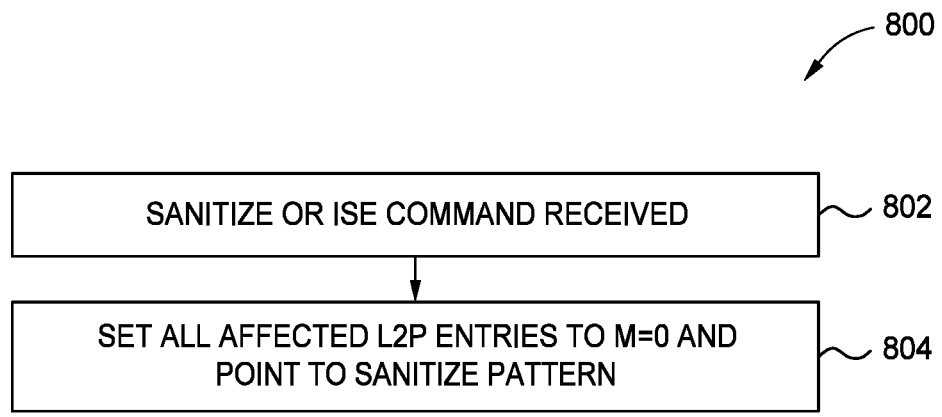
FIG. 8 is a sanitize/ISE flow diagram in accordance with another example embodiment.

Referring to FIG. 8, a sanitize/ISE flow method 800 is illustrated. At 802 a sanitize or ISE command is received at a controller of a SSD. The method proceeds to 804, wherein all affected L2P entries related to the sanitize/ISE command at 802, are updated to set the associated M value to 0 and point to the sanitize pattern.

Referring to FIG. 9A, a TCG band flow method 900 is illustrated. At 902 a set band command is received. The command may be received, for example, at a controller for a SSD. The method 900, then proceeds to 904 wherein the TCG band's key change pattern buffer is updated with new key change pattern, if provided in the set band command. At 906, the TCG bands unmap pattern buffer is updated with a new unmap pattern, if provided. At 908, the TCG bands band adjustment pattern buffer is updated with a new band adjustment pattern, if provided.

Referring to FIG. 9B, a TCG band flow method 920 is illustrated. An erase/key change command is received at 922. The received command is received, for example, at a controller for a SSD. The method then proceeds to 924, wherein all band's L2P entries are set to a value of M=0 and point to the TCG band's key change pattern.

Figure 9D:
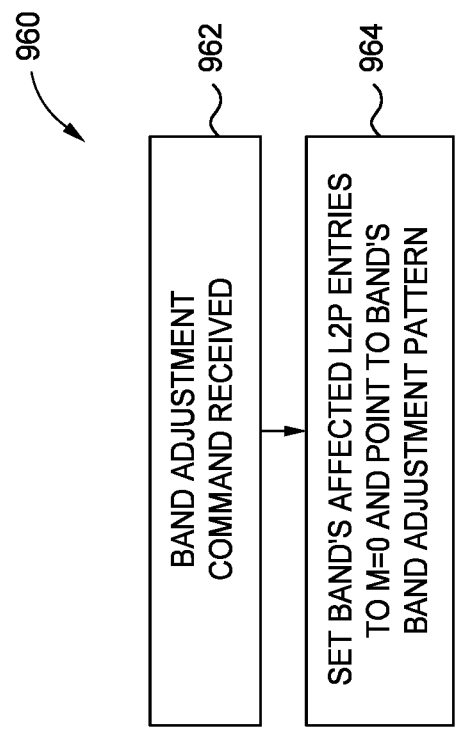
Figure 9C:
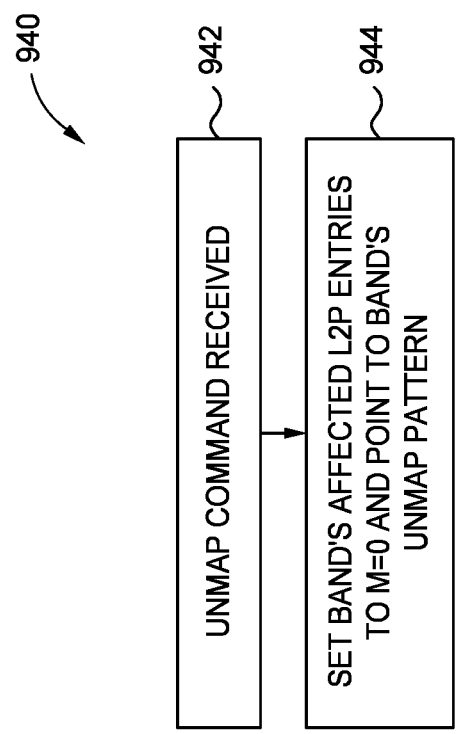

Referring to FIG. 9C, another TCG band flow method 940 is illustrated. An unmap command is received at 942. The command may be received, for example, at a controller for a SSD. The method then proceeds to 944 to set the band's L2P entries affected by the unmap command to M=0 and point to the bands unmap pattern.

Referring to FIG. 9D, another TCG band flow method 960 is illustrated. A band adjustment command is received 962. The command may be received, for example, at a controller for a SSD. The method then proceeds to 964 where the band's L2P entries that are affected are set to a value of M=0 and point to a bands adjustment pattern.

Figure 10:
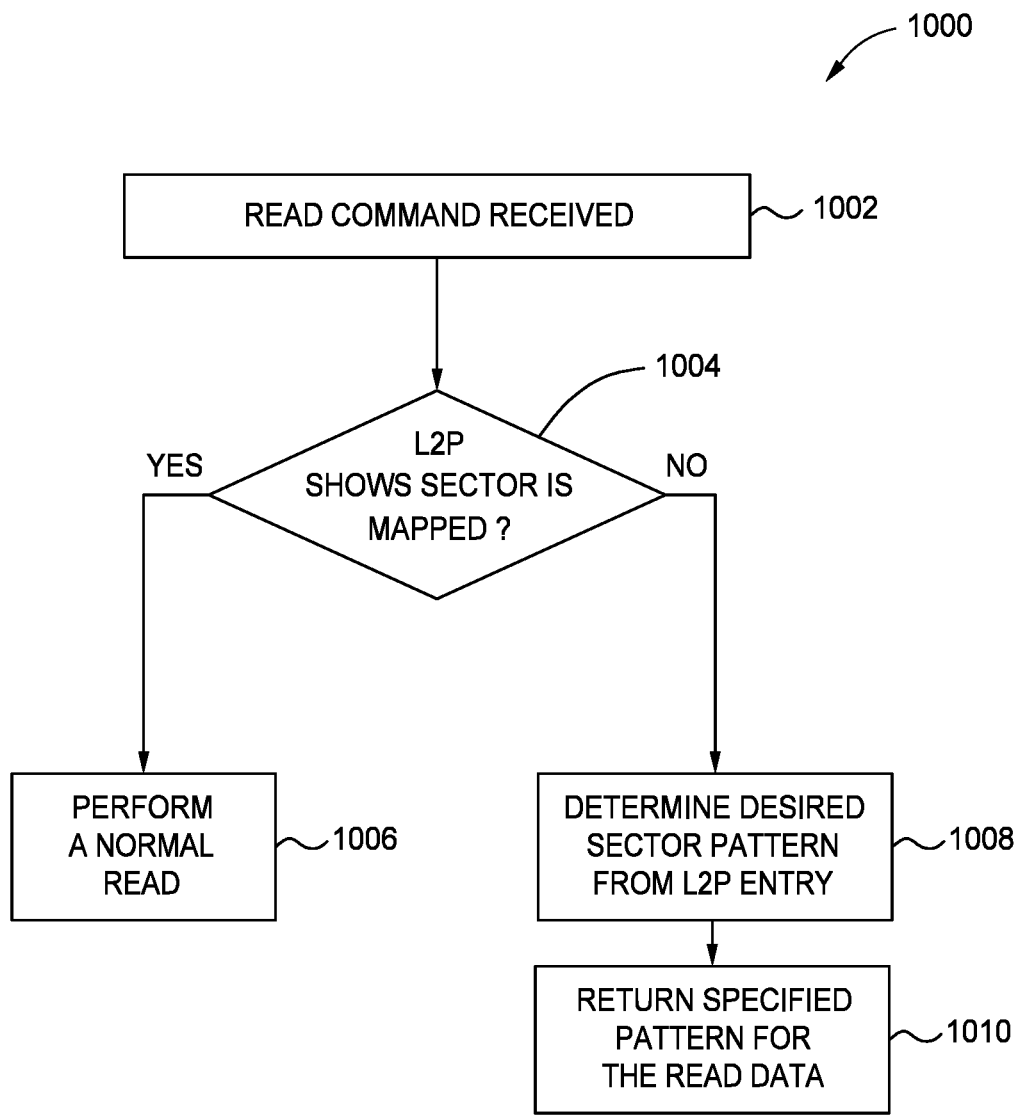
FIG. 10 is a read flow diagram in accordance with an example embodiment of the disclosure.

Referring to FIG. 10, a read flow method 1000 is described. At 1002, a read command is received at a controller for an SSD. The method proceeds to 1004, wherein a query is performed to determine if the L2P shows a sector is mapped. If the query at 1004 is true, then a normal read is performed at 1006. If the query at 1004 is not true, then at 1008 a desired sector pattern is determined from the L2P entry. The method then proceeds to 1010, wherein a specified pattern is returned for the read data.

Figure 11:
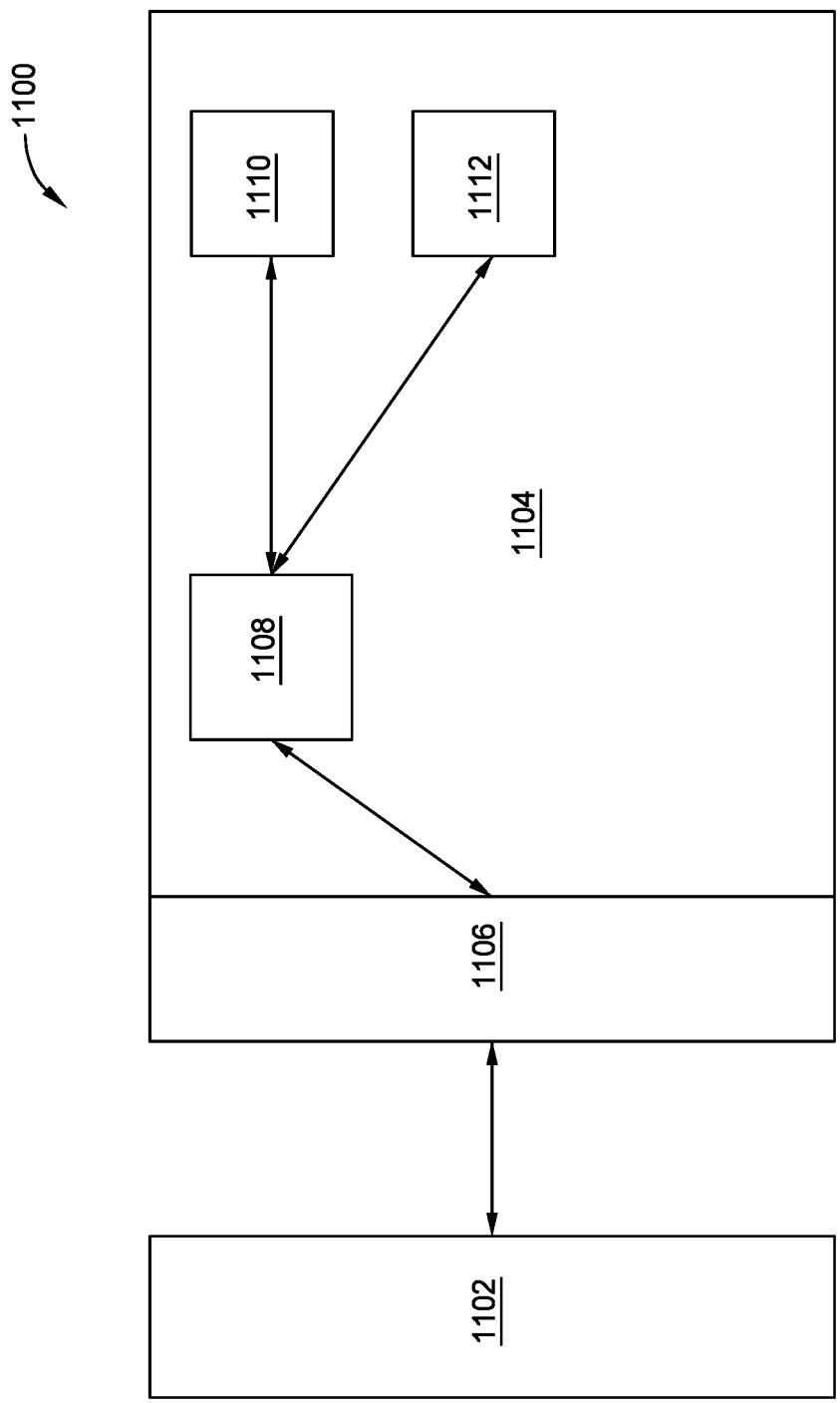
FIG. 11 is a schematic illustration of a storage system according to one embodiment.

FIG. 11 is a schematic illustration of a storage system 1100 according to one embodiment. The storage system 1100 includes a host device 1102 that is coupled to a storage device 1104 through an interface 1106. The storage device 1104 includes a controller 1108 as well as at least one non-volatile memory device 1110 and a memory device 1112 capable of storing L2P tables.

Through the above method, unmapped or mapped sectors may be evaluated for further processing. In addition to identification, aspects of the embodiments previously disclosed may be used to specify patterns or other data associated with the sectors. Data may be vendor specific, as provided in FIG. 1, related to page code data as well as subpage code data. Data length as well as pattern configuration descriptors may also be specified. In the case of mapped IUs, data such as die, page data and page offset may be identified. In the case of unmapped IUs, sector pattern buffer location and additional pattern buffer data may be present, as illustrated in FIG. 4.

Aspects of the disclosure provide for advantages over conventional methods and apparatus. As provided above, the aspects described allow for a low L2P size while providing a capability to support multiple patterns concurrently. Moreover, aspects of the disclosure provide for custom patterns to the host for a variety of sector states and can service these patterns concurrently with faster than mapped sector read performance. Such patterns may be specified by data contained in input data contained in FIGS. 1 to 4. In other embodiments, a host can maintain a plurality of sector pattern types on a drive for additional workload/drive feedback and performance.

In one example embodiment, a method is disclosed comprising providing a logical to physical table for a computing arrangement, wherein the table provides a map of logical sector addresses to physical NAND address and a mapped state of the NAND, wherein sectors of the NAND are grouped into indirection units, receiving a read command specifying read data at a controller for the NAND, the read command originating from a host, determining, through the logical to physical table, if the read command received at the controller for the NAND corresponds to an unmapped portion of the NAND; performing a read of the NAND when the logical to physical table indicates a mapped sector, determining a desired sector pattern from the logical to physical entry when the logical to physical table is unmapped and returning a specified pattern for the read data to the host.

In another example embodiment, the method may be performed wherein the NAND is in a solid state drive.

In another example embodiment the method may be performed wherein the host is a computer.

In another example embodiment, a method is disclosed comprising providing a logical to physical table for a computing arrangement, wherein the table provides a map of logical sector addresses to physical NAND address and a mapped state of the NAND, wherein sectors of the NAND are grouped into indirection units, receiving a command at a controller for the NAND, the command originating from a host, reviewing the command received at the controller for the NAND to determine if a pattern is specified for at least one sector and that the pattern specified is different than an existing pattern for the at least one sector; and changing the existing pattern to the pattern specified when the existing pattern is different than the specified pattern.

In another example embodiment, the method may be performed wherein the specified pattern corresponds to a format command.

In another example embodiment, the method may be performed wherein the specified pattern corresponds to an unmap command.

In another example embodiment, the method may be performed wherein the specified pattern corresponds to a key change command.

In another example embodiment, the method may be performed wherein the specified pattern corresponds to a sanitize command.

In another example embodiment, a method is disclosed comprising: providing a logical to physical table for a computing arrangement, wherein the table provides a map of logical sector addresses to physical NAND address and a mapped state of the NAND, wherein sectors of the NAND are grouped into indirection units, receiving a command at a controller for the NAND, the read command originating from a host, reading data in the logical to physical table to determine a pattern for at least one sector of the NAND and encoding data into an indirection unit based upon a specific pattern received at the controller for the NAND.

In another example embodiment, an arrangement is disclosed comprising means for providing a logical to physical table for a computing arrangement, wherein the table provides a map of logical sector addresses to physical NAND address and a mapped state of NAND, wherein sectors of the NAND are grouped into indirection units; means for receiving a read command specifying read data at a controller for the NAND, the read command originating from a host; means for determining if the read command received at the controller for the NAND corresponds to an unmapped portion of the NAND; and means for performing a read of the NAND when the logical to physical table indicates a mapped sector.

In a further embodiment, the arrangement may further comprise means for determining a desired sector pattern from the logical to physical entry when the logical to physical table is unmapped and means for returning a specified pattern for the read data to the host.

In another example embodiment, an arrangement is disclosed comprising means for providing a logical to physical table for a computing arrangement, wherein the table provides a map of logical sector addresses to physical NAND address and a mapped state of the NAND, wherein sectors of the NAND are grouped into indirection units; means for receiving a command at a controller for the NAND, the command originating from a host; means for reviewing the command received at the controller for the NAND to determine if a pattern is specified for at least one sector and that the pattern specified is different than an existing pattern for the at least one sector; and means for changing the existing pattern to the pattern specified when the existing pattern is different than the specified pattern.

In one embodiment, a storage device, comprises: a memory device containing a logical to physical table for a computing arrangement, wherein the table provides a map of logical sector addresses to physical address and a mapped state of the memory device, wherein sectors of the memory device are grouped into indirection units; and a controller coupled to the memory device, the controller is configured to: receive a read command specifying read data at the controller for the memory device, the read command originating from a host; determine, through the logical to physical table, if the read command received at the controller corresponds to an unmapped portion of the memory device; perform a read of the memory device when the logical to physical table indicates a mapped sector; determine a desired sector pattern from the logical to physical entry when the logical to physical table is unmapped; and return a specified pattern for the read data to the host. The controller is further configured to review the command received at the controller to determine if a pattern is specified for at least one sector and that the pattern specified is different than an existing pattern for the at least one sector. The controller is further configured to change the existing pattern to the pattern specified when the existing pattern is different than the specified pattern. The specified pattern may correspond to either a format command, an unmap command, key change command, or a sanitize command. The controller is configured to set all affected L2P entries to M=0.

In another embodiment, a storage device, comprises: a memory device containing a logical to physical table for a computing arrangement, wherein the table provides a map of logical sector addresses to physical address and a mapped state of the memory device, wherein sectors of the memory device are grouped into indirection units; and a controller coupled to the memory device, the controller is configured to: receive a TCG band command; update TCG band's key change pattern buffer with new key change pattern; update TCG's band unmap pattern; and update TCG band's band adjustment pattern buffer with new band adjustment pattern. The controller is further configured to receive an erase band/key change command. The controller is further configured to set all band's L2P entries to M=0 and point to band's key change pattern. The controller is further configured to receive an unmap command. The controller is further configured to set all band's L2P entries to M=0 and point to band's unmap pattern. The controller is further configured to receive a band adjustment command. The controller is further configured to set all band's L2P entries to M=0 and point to band's band adjustment pattern.

In another embodiment, a storage device, comprises: a memory device; means for providing a logical to physical table for a computing arrangement, wherein the table provides a map of logical sector addresses to physical address and a mapped state of the memory device, wherein sectors of the memory device are grouped into indirection units; means for receiving a command at a controller for the memory device, the command originating from a host; means for reviewing the command received at the controller to determine if a pattern is specified for at least one sector and that the pattern specified is different than an existing pattern for the at least one sector; and means for changing the existing pattern to the pattern specified when the existing pattern is different than the specified pattern. The storage device further comprises means for receiving a read command specifying read data at a controller for the memory device, the read command originating from a host; means for determining if the read command received at the controller for the memory device corresponds to an unmapped portion of the memory device; and means for performing a read of the memory device when the logical to physical table indicates a mapped sector. The storage device further comprises means for determining a desired sector pattern from the logical to physical entry when the logical to physical table is unmapped; and means for returning a specified pattern for the read data to the host. The storage device further comprises means to set all L2P entries to M=0. The storage device further comprises means to point to a key change pattern or a sanitize pattern or an unmap pattern.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
 a memory device containing a logical to physical table for a computing arrangement, wherein the table provides a map of logical sector addresses to physical address and a mapped state of the memory device, wherein sectors of the memory device are grouped into indirection units; and
 a controller coupled to the memory device, the controller is configured to:
  receive a read command specifying read data at the controller for the memory device, the read command originating from a host;
  determine, through the logical to physical table, if the read command received at the controller corresponds to an unmapped portion of the memory device;
  perform a read of the memory device when the logical to physical table indicates a mapped sector;
  determine a desired sector pattern from the logical to physical entry when the logical to physical table is unmapped;
  reviewing the read command received at the controller to determine if a pattern is specified for at least one sector and that the pattern specified is different than an existing pattern for the at least one sector; and
  return a specified pattern for the read data to the host.

2. The storage device of claim 1, wherein the controller is further configured to change the existing pattern to the pattern specified when the existing pattern is different than the specified pattern.

3. The storage device of claim 2, wherein the specified pattern corresponds to a format command.

4. The storage device of claim 2, wherein the specified pattern corresponds to an unmap command.

5. The storage device of claim 2, wherein the specified pattern corresponds to a key change command.

6. The storage device of claim 2, wherein the specified pattern corresponds to a sanitize command.

7. The storage device of claim 2, wherein the controller is configured to set all affected L2P entries to M=0.

8. A storage device, comprising:
 a memory device containing a logical to physical table for a computing arrangement, wherein the table provides a map of logical sector addresses to physical address and a mapped state of the memory device, wherein sectors of the memory device are grouped into indirection units; and
 a controller coupled to the memory device, the controller is configured to:
  receive a TCG band command;
  update TCG band's key change pattern buffer with new key change pattern;
  update TCG's band unmap pattern; and
  update TCG band's band adjustment pattern buffer with new band adjustment pattern.

9. The storage device of claim 8, where the controller is further configured to receive an erase band/key change command.

10. The storage device of claim 9, wherein the controller is further configured to set all band's L2P entries to M=0 and point to band's key change pattern.

11. The storage device of claim 8, wherein the controller is further configured to receive an unmap command.

12. The storage device of claim 11, wherein the controller is further configured to set all band's L2P entries to M=0 and point to band's unmap pattern.

13. The storage device of claim 8, wherein the controller is further configured to receive a band adjustment command.

14. The storage device of claim 13, wherein the controller is further configured to set all band's L2P entries to M=0 and point to band's band adjustment pattern.

15. A storage device, comprising:
a memory device;
means for providing a logical to physical table for a computing arrangement, wherein the table provides a map of logical sector addresses to physical address and a mapped state of the memory device, wherein sectors of the memory device are grouped into indirection units;
means for receiving a read command at a controller for the memory device, the command originating from a host;
means for determining, through a logical to physical table, that the read command received at the controller corresponds to an unmapped portion of the memory device;
means for determining a desired sector pattern from the logical to physical entry;
means for reviewing the command received at the controller to determine if the desired sector pattern is specified for at least one sector and that the desired sector pattern specified is different than an existing pattern for the at least one sector; and
means for changing the existing pattern to the pattern specified when the existing pattern is different than the pattern specified.

16. The storage device of claim 15, further comprising:
means for receiving a read command specifying read data at a controller for the memory device, the read command originating from a host;
means for determining if the read command received at the controller for the memory device corresponds to an unmapped portion of the memory device; and
means for performing a read of the memory device when the logical to physical table indicates a mapped sector.

17. The storage device of claim 16, further comprising:
means for returning the pattern specified for the read data to the host.

18. The storage device of claim 15, further comprising means to set all L2P entries to M=0.

19. The storage device of claim 18, further comprising means to point to a key change pattern or a sanitize pattern or an unmap pattern.

* * * * *